No. 889,678. PATENTED JUNE 2, 1908.
C. B. HATFIELD.
SHOCK ABSORBER FOR SELF PROPELLED VEHICLES.
APPLICATION FILED NOV. 23, 1906.
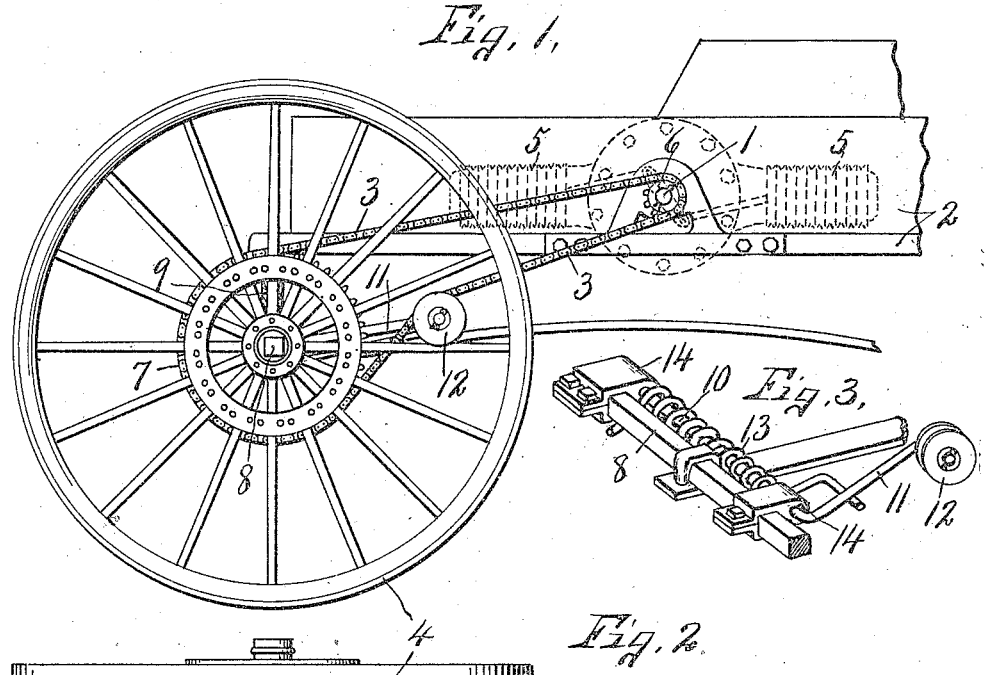
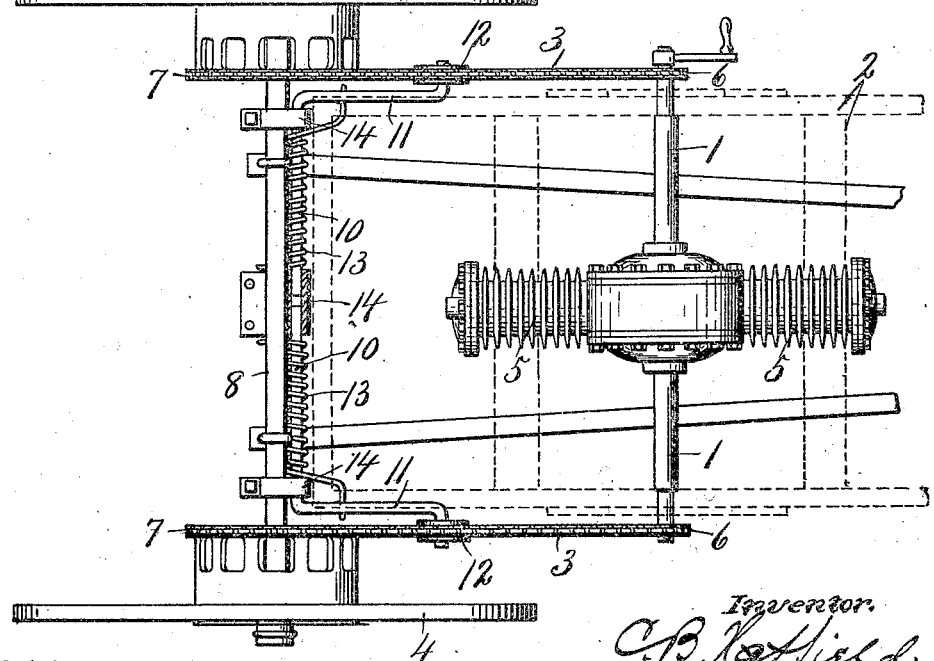

UNITED STATES PATENT OFFICE.

CHARLES B. HATFIELD, OF CORTLAND, NEW YORK, ASSIGNOR TO HATFIELD MOTOR VEHICLE COMPANY, OF CORTLAND, NEW YORK, A CORPORATION OF NEW YORK.

SHOCK-ABSORBER FOR SELF-PROPELLED VEHICLES.

No. 889,678.

Specification of Letters Patent.

Patented June 2, 1908.

Application filed November 23, 1906. Serial No. 344,729.

*To all whom it may concern:*

Be it known that I, CHARLES B. HATFIELD, of Cortland, in the county of Cortland, in the State of New York, have invented new and useful Improvements in Shock-Absorbers for Self-Propelled Vehicles, of which the following, taken in connection with the accompanying drawings, is a full, clear, and exact description.

This invention relates to certain improvements in self-propelled vehicles, and refers more particularly to what is technically known as "shock-absorbers" to prevent the sudden upward rebound of the body and its supporting frame by the reaction of the supporting springs incidental to the passage of the vehicle over obstructions and uneven surfaces. In machines of this character it is customary to mount the motor or motors upon the body or supporting frame and to transmit motion from the motor shaft to the traction wheels through the medium of one or more belts or chains, and inasmuch as the body and axles are movable vertically relatively to each other, it is obvious that the motor-shaft and axle of the traction wheels are also movable vertically relatively to each other, thereby causing more or less relative vertical movement of opposite ends of the driving chain or chains.

The essential object of my present invention is to utilize one or both of these chains as one of the elements of a "shock absorber" by associating therewith a bearing which is spring tensioned in a vertical direction against the chain intermediate the driving and driven elements, and to provide means for regulating the pressure of the bearing against the chain to properly adjust the resistance to the sudden rebound or upward throw of the body due to the reaction of the springs while the vehicle is passing over obstructions and uneven surfaces, as previously mentioned.

A further object is to render these bearings capable of guiding and retaining the chain or belt upon its driving and driven elements.

Other objects and uses will be brought out in the following description.

In the drawings—Figure 1 is a side elevation of a portion of a self-propelled vehicle equipped with my improved shock absorber. Fig. 2 is a top plan of the same except that the body is removed to more clearly illustrate the position of the underlying elements. Fig. 3 is a perspective view of one of the spring-tensioned shock-absorbing bearings and chain guides showing the adjacent portion of the vehicle upon which it is mounted.

In order to clearly demonstrate the practicability of my invention, I have shown the motor-shaft —1— as mounted upon the body-supporting frame —2— and as connected by sprocket-chains —3— to the traction wheels, as —4—, forming a part of the running gear of the vehicle.

The motor-shaft —1— may be driven by any suitable motor or motors, as opposed vapor engines —5— best seen in Fig. 2, said motor-shaft being provided with suitable sprocket wheels —6— from which motion is transmitted by the chain belts —3— to additional, but somewhat larger sprocket wheels —7— which are secured to the traction wheels —4— in any suitable manner not necessary to herein illustrate or describe.

The body supporting frame —2— is supported upon the axle, as —8—, of the traction-wheels through the medium of the usual interposed spring —9— partially shown in Fig. 1.

Extending parallel with, and in close proximity to the axle —8—, I have shown a pair of independently movable rock-shafts —10— having forwardly projecting rock-arms —11—, each carrying a grooved roller bearing or sheave —12—, said rock-arms —11— and their bearings 12— being spring pressed upwardly against the underside of the chains —3— by separate coil springs —13—, as best seen in Figs. 2 and 3.

The rock-arms —11— are preferably formed upon and integral with one end of their respective rock-shafts —10—, said shafts being journaled at their ends in suitable bearings —14— which are secured to the axle —8—.

The springs —13— are coiled around their respective rock-shafts —10—, each spring having one end engaged with the under side of the axle and its other end engaged with the under-side of its rock-arm —11— between the arms of the rock-shaft and that of the roller or sheave —12— so as to exert an uplift or spring pressure upon the rock-arm —11— to press the roller or sheave —12— firmly against the underside of its chain —3—, said rollers being preferably grooved as previously stated, to receive their respective chains, and thereby guide them in their movements to retain them upon their respective sprocket wheels.

It will be observed that I have shown the lower sides of the chains as somewhat loose or slack, and as deflected upwardly from a straight line between the driving and driven elements for the purpose of affording a limited action of this part of the chain upon the shock-absorbing element, as the rock-arm —11— against the action of the spring —13—.

It will be seen that the rebound or sudden upward thrust of the body-supporting frame is always in a vertical direction, tending to straighten out the lower sides of the sprocket-chains —3— and that this tendency is resisted by the upward pressure of the bearings —12— to a degree corresponding to the tension of the springs 13—, such tension being adjusted by giving one or more extra turns to either of its ends in a manner well known for tensioning this class of springs.

It is, of course, apparent that any excessive upward movement or rebound of the body-supporting frame from its normal position would increase the distance between the axes of the driving and driven elements, and would thereby tend to straighten out or take up the slack in the lower sides of the chain against which the sheaves or rollers —12— bear, and that by yieldingly pressing these rollers upwardly against the slack under sides of the chains, through the medium of the springs 13—, the sudden upward thrust or rebound of the body-supporting frame is transmitted to the springs 13—, which are of sufficient tension to practically absorb or resist such upward thrust or rebound. This resistance of the springs 13—, as transmitted through the medium of the rock-arms —11— and bearings 12—, is of course, gradual, but sufficiently effective to prevent sudden or forcible upward thrust or rebound of the body-supporting frame, thereby removing the cause of one of the most objectionable experiences of riding in this class of vehicles.

The device herein shown and described is particularly simple in construction, and efficient in operation, but I have purposely omitted many of the mechanisms commonly used in self propelled vehicles for the purpose of more clearly bringing out the essential features and objects of the shock absorber, which forms the subject matter of this invention, and while all of the elements necessary to carry out these objects are clearly shown and described, I do not wish to limit myself to such structure as it is clearly evident that other structural elements may be substituted and their arrangement modified without departing from the spirit of this invention.

What I claim is:

1. In combination with the body and running gear of a vehicle, a motor on the body, an endless belt for transmitting motion from the motor to one of the traction wheels, a rock-arm pivoted near the axis of the wheel, a roller on the rock-arm receiving and guiding the belt, and means for rocking said arm to press the roller against the belt with sufficient force to deflect a portion thereof from a direct line to resist upward thrust or rebound of the body of the vehicle.

2. A shock absorber for self-propelled vehicles, in combination with the rear axle of the vehicle, and traction wheels journaled on the axle, a sprocket wheel rotating with one of the traction wheels, a body and a spring interposed between the body and rear axle for supporting the body, a driving shaft mounted on the body and provided with a sprocket wheel, a sprocket chain connecting the sprocket wheels, a rock arm and fixed bearings therefor, secured to the axle, said rock-arm being provided with a bearing engaging the under side of the sprocket chain, and a spring for rocking the arm upwardly and pressing said bearing against the under side of the chain with sufficient force to deflect the latter upwardly from a straight line.

3. In combination with the running gear of a vehicle, said running gear being provided with a rear axle and traction wheels, a motor on the body, means including a belt for transmitting motion from the motor to one of the traction wheels, and a rock arm having one end pivoted near the axle and its other end provided with a bearing and spring pressed upwardly to force said bearing against the under side of the belt with sufficient pressure to deflect said side of the belt upwardly from a straight line whereby the upward movement of the body relative to the running gear tends to straighten the lower side of the belt against the tension of the upwardly spring pressed arm.

4. In combination with the running gear and body of a vehicle, and an interposed spring for supporting the body, a motor on the body, means including a belt for transmitting motion from the motor to one of the traction wheels of the running gear, a rock arm having one end pivoted near the axle of the running gear, and its other end provided with a bearing engaging the under side of the belt, and yielding means for pressing said rock-arm and bearing upwardly with sufficient pressure to deflect the under side of the belt from a straight line.

In witness whereof I have hereunto set my hand this 20th day of November 1906.

CHARLES B. HATFIELD.

Witnesses:
H. E. CHASE,
MILDRED M. NOTT.